Sept. 21, 1943.   L. DUFOUR   2,329,885

SUPPLYING OF GASES TO TWO STROKE INTERNAL COMBUSTION ENGINES

Filed April 23, 1942

INVENTOR
*Leon Dufour,*

BY *Wolhaupter & Groff*
his ATTORNEYS

Patented Sept. 21, 1943

2,329,885

UNITED STATES PATENT OFFICE 2,329,885

SUPPLYING OF GASES TO TWO-STROKE
INTERNAL COMBUSTION ENGINES

Léon Dufour, Geneva, Switzerland

Application April 23, 1942, Serial No. 440,230
In Switzerland February 17, 1941

12 Claims. (Cl. 123—65)

This invention relates to two-stroke cycle internal combustion engines with distribution by the piston, and the prevention of waste of the fuel charge by escape of a part thereof with the scavenged burned gases, and particularly to the provision of means for causing the path in the cylinder of the charge and the path of the burned gases being scavenged, to be closely adjoining and to form between them a region of eddies.

It is known that the principal cause for the unsatisfactory output of two-stroke cycle internal combustion engines with distribution by the piston is the defective filling of the cylinders with the supply gases.

The supplying of an engine of this character with fresh gases, when these fresh gases are carburetted air derived from the carburetter, or when they are pure combustion air, as in an internal combustion engine with injection of the fuel into the cylinder head, can only be effected during a very short period of time during which the piston exposes the admission port or ports, known as the transfer ports, for these gases. These supply gases should therefore have a high inlet velocity so that during this very short period of time the volume of gas of the charge can pass through this relatively small port.

Up to the present time, endeavors have been made to improve the filling of supply of the charge to the cylinders by means of devices which have for their object to utilise this high velocity of admission of the supply gases into the cylinder for scavenging the burnt gases and urging these along so that they escape as completely as possible through the exhaust port or ports.

The various scavenging devices for a two-stroke cycle internal combustion engine with distribution by the piston, thus proposed up to the present time, do not take sufficiently into consideration the conditions under which either the admission of the supply gases into the cylinder or the exhaust of the burnt gases, takes place in practice. In fact, on the one hand, the exhaust commences at a moment at which the combustion gases still have a sufficient pressure to escape of their own accord at a high velocity into the atmosphere. There is therefore no reason for them to have to be "scavenged" to get them out of the cylinder, provided that an equivalent quantity of fresh supply gas replaces them. Some designers have well recognised this as there are in existence engines in which the suction of the fresh gases is effected solely by the decrease of pressure which is caused in the cylinder by reason of the outflow of the exhaust gases.

On the other hand, theoretical considerations and experience show that the admission velocity of the supply gases or charge into the cylinder is much too large relative to the time available for causing them to traverse the path separating the transfer port from the exhaust port in passing through the cylinder head. Actually they reach the exhaust port well before this is closed by the piston and they escape with the burnt gases. It has been possible to reduce this leakage of supply gases only in very small proportions by the numerous means disclosed up to the present time, either for extending the path of the fresh gases in the cylinder to a maximum value (reverse scavenging), or for slowing down their rate of flow and accumulating them in the upper portion of the cylinder. For obtaining the latter result in particular, endeavors have been made to provide pockets of various shapes in the head of the cylinder into which the jet of fresh gases is projected, for the purpose of creating a vortex therein which is adapted to prevent these gases from continuing along their path towards the exhaust port. These devices, however, do not enable the desired purpose to be achieved completely, because if the gases which first reach the pocket of the cylinder head accumulate therein and in effect form a vortex, those which follow can no longer enter the pocket and cannot therefore be retained therein. Also the capacity of the pocket is much too small for containing all the supply gases, because the capacity of the entire cylinder head, when the piston is at the upper dead center position, is only about a fourth or a fifth of the cylinder charge. Consequently the gases which follow those which have entered first meet a pocket which is already full of whirling gases, rebound from these and reach the exhaust port before this has been closed by the piston.

The present invention constitutes a new principle consisting in:

a. Employing space within the cylinder itself for accumulating therein practically all the supply gases in the form of a vortex;

b. Absorbing the kinetic energy of these supply gases in the vortex itself in such a manner that these gases no longer have a tendency to rebound towards the exhaust port.

The new principle of supply may therefore be termed "supply by whirling."

The method which forms the subject of the present invention therefore consists in supplying a two-stroke internal combustion engine, with a piston-controlled distribution, by directing the supply gases from the bottom upwardly along one wall of the cylinder, according to one of the numerous known methods, then reversing the direction of this ascending stream of gas through about 180° and causing it to descend sufficiently close to the rising stream so that practically no quantity of burnt gases remains included between these rising and descending streams, and so that these two closely adjoining streams of opposite direction create between them one or more vortices, within the space within the cylinder formed by the parts of the cylinder, of the piston and of the cylinder head adjacent the ascending stream, these vortices, formed practically solely by the supply gases, themselves absorbing the kinetic energy of these gases and thus preventing them from rebounding towards the exhaust port before this is closed, thereby enabling practically all of the supply gases to be retained in the cylinder.

The device for carrying the method into effect is provided with known means for directing the supply gases from the bottom upwards along one wall of the cylinder, and is distinguished from known devices in that the cylinder head is provided with a guide chamber which reverses the direction of the stream of supply gases and directs it from the top downwardly into the interior space within the cylinder formed by the parts of the cylinder, of the piston and of the cylinder head adjacent the ascending stream, the descending stream being directed sufficiently close to the rising stream so that practically no quantity of burnt gases remains included between these two rising and descending streams and so that these two adjoining streams of opposite direction create between them a vortex formed practically solely by the supply gases, which vortex absorbs substantially all the kinetic energy of the gases and thus prevents them from rebounding and reaching the exhaust port before this is closed.

The accompanying drawing shows, diagrammatically and by way of example, several forms of construction of the subject of the invention.

Figure 1:
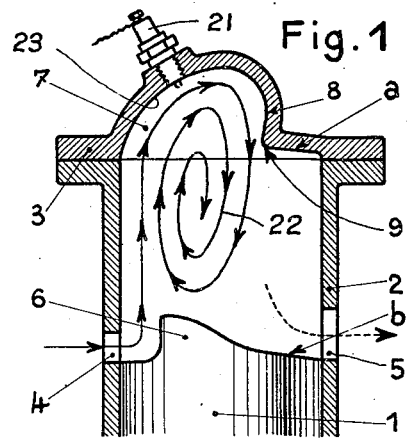
Fig. 1 shows in vertical section one form of construction of a cylinder provided with structure according to the invention.
Figure 2:
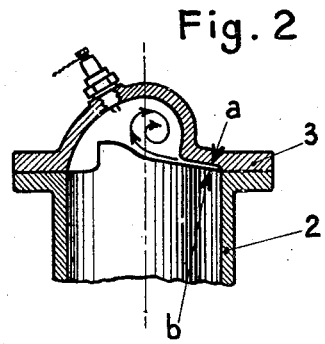
Fig. 2 shows in vertical section the piston at the upper dead center position.
Figure 3:
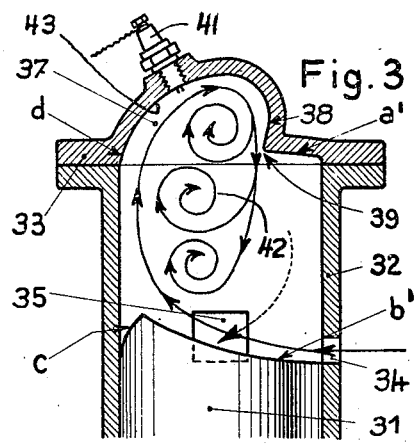
Fig. 3 shows in section a second form of construction.
Figure 4:
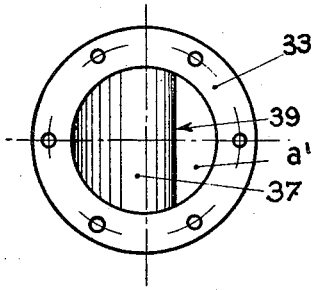
Fig. 4 is a top plan view with parts broken away of the cylinder head on a smaller scale.
Figure 5:
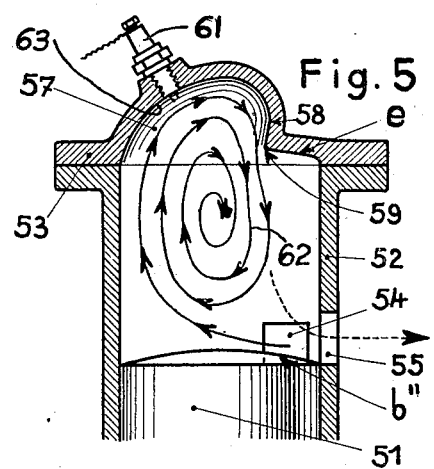
Fig. 5 shows a section of a third form of construction.

According to Figs. 1 to 6 of the drawing, a cylinder, supplied according to the method forming the subject of the present invention, is provided, as in known cylinders with a piston, a cylinder and a cylinder head shown in Fig. 1 respectively at 1, 2, and 3. In the walls of the cylinder, are provided admission (transfer) and exhaust ports 4 and 5 (Fig. 1). As in the majority of known two-stroke engines, the fresh gases admitted into the cylinder are guided along one of its walls. For this purpose there may be provided an arrangement according to Fig. 1, provided with an admission port 4, opposite the exhaust port 5, and a projection 6, provided on the piston 1, or, according to Fig. 3, with an admission port 34 and two exhaust ports 35, the upper face of the piston being shaped in such a manner, in both Fig. 1 and Fig. 3, as to direct the fresh gases along the wall of the cylinder opposite the admission port. There may also be provided another form of arrangement according to Fig. 5, provided with two admission ports 54 arranged symmetrically to the left and right of an exhaust port 55, the jets of fresh gas being directed towards one another at such an angle, that they combine in an ascending stream running along the wall of the cylinder opposite the exhaust port. These three types of admission are indicated by way of example and it will be understood that any other known device, enabling an ascending stream of gas along one wall of the cylinder to be obtained, may be used in combination with the method of supply forming the subject of the present invention.

The fresh gases thus passing together in a stream ascending along one wall of the cylinder, penetrate into a guide chamber 7 hollowed into the cylinder head 3. This guide chamber is shaped in such a manner as to reverse the direction of the stream of fresh gases by about 180° and to direct the latter from the top downwardly immediately at the side of the rising current along the wall of the cylinder, that is to say immediately adjoining the ascending stream. For this purpose, and at a distance from the wall opposite the ascending current between ⅕ and ½ the diameter of the cylinder, the profile of the guide chamber 7 terminates in a straight wall 8 tangential to the curvature of the profile and slightly inclined towards the ascending current. Good results have been obtained with an inclination of between 5 and 15° relatively to the axis of the cylinder. In practice this straight line is preferably inclined from 7 to 8° relatively to the axis of the cylinder. The gases are thus directed from the top downwardly immediately at the side of the stream of ascending gases so as practically not to enclose any quantity of burnt gases between these two streams which are flowing in opposite directions.

The descending stream of gases being thus positioned adjoining to the ascending gas stream, there is produced a violent whirling between these two streams of gas, as is necessarily produced between two closely adjacent jets of fluid which are flowing in opposite directions. This whirling is produced in the space within the cylinder determined by the wall along which the ascending gases pass and by the parts of the piston and of the cylinder head adjacent this wall of the cylinder. This whirling vortex contains practically only supply gases which have entered through the transfer port and it absorbs itself all the velocity that is to say all the kinetic energy of these supply gases. These will then no longer have any tendency to escape through the exhaust port at the same time as the burnt gases, while it is difficult to experimentally ascertain exactly the shape and dimension of the vortex thus formed in the interior of the cylinder, and in particular to known whether there is formed a single vortex of gas between the two adjoining streams as indicated in Figs. 1 and 5, or, on the contrary, whether a number of successive vortices are created and maintained one above the other, as indicated in Fig. 3. It is also not possible to know whether the vortex remains flattened as indicated in Fig. 1, or whether it spreads downwardly as indicated in Fig. 5. However these details of manner of operation are not essential to an understanding of the construction of the apparatus used in the present invention, and the desired result, which is to retain in the cylinder practically all the fresh gases admitted, is obtained in all cases.

This vortex or these vortices continue their movement of rotation during the very short time of the compression stroke. For further increasing their speed of rotation at the moment of ignition, the inner face $a$ of the cylinder head, closing the cylinder, is shaped parallel to the upper face $b$ of the piston (see Fig. 1). This face $a$ of the cylinder head forms an angle 9 which is substantially a right angle with the straight wall 8 which terminates the guide 7. For avoiding heating, this angle is flattened or rounded. At the moment at which the piston of Fig. 1 reaches the upper dead center position, a stream of gas is driven between the faces $a$ and $b$ of the cylinder head and of the piston, and directed towards the interior of the cylinder head in the direction of rotation of the vortex in such a manner that it tends to further increase the speed of rotation of the latter, which is very favorable for the good efficiency of the engine, as is known. In the case of a piston having the shape shown in Fig. 3, this same phenomenon is produced also between the parts $c$ and $d$ of the piston and cylinder head.

Figure 6:
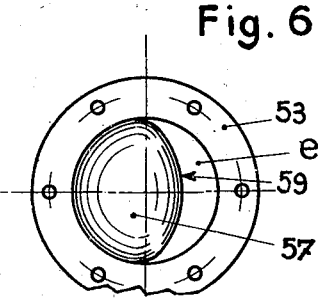
Fig. 6 is a top plan view with parts broken away of the cylinder head of the form of Fig. 3 on a smaller scale.

It will be understood that the guide member or chamber may be cylindrical, that is to say produced by a true generatrix as shown in Figs. 3 and 4, or produced by a curved generatrix with a center of curvature located towards the interior of the cylinder as shown in Figs. 5 and 6. This latter shape of the guide chamber appears to give the best result as the stream of supply gases is probably better maintained in the median plane of the cylinder, that is to say in a zone of the latter in which the vortices can probably be formed more easily.

The profile of the guide chamber is preferably a profile with variable radii of curvature, as shown in Figs. 1, 3 and 5. Thus the part of the guide 7, extending from the wall of the cylinder along which the ascending gases pass, preferably has a large radius of curvature, while the parts of the guide chamber located above the center of the cylinder have a profile of which the radii of curvature decrease progressively up to the tangential point with the wall 8. A guide of which the profile has decreasing radii of curvature guides the stream of supply gases better and enables its change of direction through 180° to be effected more easily. In fact as the supply gases probably enter the guide slightly fanwise, it is advantageous, for the purpose of avoiding rebounding of some parts of the stream of ascending gases, for the parts of the guide member, which are located near the wall of the cylinder along which the ascending gases pass, to have a profile of large radius of curvature.

It will be obvious that I have provided a substantial improvement in two-cycle internal combustion engines, which will materially improve their performance. It will be apparent to those skilled in the art that the manner of construction of an internal combustion engine which I have disclosed is susceptible of modification to adapt it to particular situations, and all such modifications which are comprehended within the scope of the appended claims, I consider to be a part of my invention.

I claim:

1. In a method of supplying gases to a two-stroke internal combustion engine of which the distribution is controlled by a piston and in which the supply gases are directed from the bottom upwardly along one wall of the cylinder, the step of changing the direction of the said ascending gas stream by about 180° and causing it to descend sufficiently close to the said ascending stream so that substantially no burnt gases remain between the said ascending and descending streams, the said two oppositely directed streams being juxtaposed and creating between them one or more vortices within the space in the cylinder formed by the parts of the cylinder, of the piston and of the cylinder head adjacent the said ascending stream, said vortices being formed substantially solely by the supply gases, whereby said gases are prevented from rebounding towards the exhaust port before this is closed, thus enabling substantially the total quantity of the supply gases to be retained in the cylinder.

2. A device for use in supplying gases to two-stroke internal combustion engines comprising in combination a cylinder having a cylinder head, means for directing the supply gases from the bottom upwards along one wall of the cylinder, a guide chamber formed in said cylinder head, said guide chamber serving to change the direction of the stream of the supply gases and directing it downwardly into the cylinder space formed by the parts of the cylinder, of the piston and of the cylinder head adjacent said ascending stream, the said descending stream being sufficiently close to the said ascending stream so that substantially no burnt gases remain included between said ascending and descending stream, said streams being juxtaposed and moving in opposite directions serving between them to produce a vortex formed substantially solely of supply gases, said vortex absorbing the kinetic energy of said gases and preventing them from rebounding and reaching the exhaust port before this is closed.

3. A device according to claim 2, wherein said guide chamber for changing the direction of the gases is terminated by a straight wall which forms a tangent to the curvature of said guide chamber, said straight wall being located at a distance of from ⅕ to ½ the diameter of said cylinder from the wall of the cylinder opposite the wall of said cylinder along which the gas stream ascends.

4. A device according to claim 2, wherein said guide chamber for changing the direction of the gases is terminated by a straight wall which forms a tangent to the curvature of said guide chamber, said straight wall being located at a distance of from ⅕ to ½ the diameter of said cylinder from the wall of the cylinder opposite the wall of said cylinder along which the gas stream ascends, said straight wall being slightly inclined relatively to the axis of the cylinder towards the ascending stream of supply gases.

5. A device according to claim 2, wherein said guide chamber for changing the direction of the gases is terminated by a straight wall which forms a tangent to the curvature of said guide chamber, said straight wall being located at a distance of from ⅕ to ½ the diameter of said cylinder from the wall of the cylinder opposite the wall of said cylinder along which the gas stream ascends, said straight wall being slightly inclined relatively to the axis of the cylinder towards the ascending stream of supply gases, at an angle of from 5 to 15°.

6. A device according to claim 2 wherein the guide chamber is terminated by a straight wall which is tangential to the curved portion of the guide chamber, the cylinder head having a face which forms substantially a right angle with the straight wall of said guide chamber, said face being parallel to the upper face of the piston which in its upper dead center position almost reaches said face.

7. A device according to claim 2, wherein the guide is terminated by a straight wall which is tangential to the curved portion of the guide chamber, the cylinder head having a face which forms substantially a right angle with the straight wall of said guide chamber, said face being parallel to the upper face of the piston which in its upper dead center position almost reaches said face, the intersection between the straight wall of the guide and the face of the cylinder head being obtused.

8. A device according to claim 2, wherein said guide chamber is produced by a curved generatrix.

9. In a two-strike internal combustion engine, having piston distribution, a cylinder comprising a cylinder head and having an intake port and and exhaust port formed in its lateral walls, a piston reciprocating in said cylinder, the top exposed face of the head of said piston having an inclined contour adapted to direct the intake stream of supply gases upwardly along a first lateral wall of said cylinder, said cylinder head comprising a guide chamber extending from said first lateral wall to an intermediate point thereof, said guide chamber having the contour of its internal surface shaped to guide the stream of supply gases from their point of upward approach incidence on the initial portion thereof at said first lateral wall along said internal surface and to discharge said stream diametrically into the interior of said cylinder in a path immediately adjacent to their upward approach path along said lateral wall, but in the direction opposite to their direction along said approach path.

10. An engine according to claim 9, the discharge portion of said internal surface terminating in a straight wall tangential to the contour of said internal surface and inclined at an angle of seven to eight degrees to the axis of said cylinder toward said first lateral wall.

11. An engine according to claim 9, the discharge portion of said internal surface terminating in a straight wall tangential to the contour of said internal surface, and the internal surface of said cylinder head extending from the second lateral wall of said cylinder which is opposite said first lateral wall obliquely to the axis of said cylinder and meeting said straight terminal wall of said guide chamber substantially at a right angle.

12. An engine according to claim 9, the discharge portion of said internal surface terminating in a straight wall tangential to the contour of said internal surface, and the internal surface of said cylinder head extending from the second lateral wall of said cylinder which is opposite said first lateral wall obliquely to the axis of said cylinder and meeting said straight terminal wall of said guide chamber substantially at a right angle, and the portion of the exposed face of said piston which is opposite said obliquely extending portion of the internal surface of said cylinder head being formed substantially parallel to said obliquely extending portion.

LÉON DUFOUR.